United States Patent [19]
Naganuma

[11] Patent Number: 6,046,813
[45] Date of Patent: Apr. 4, 2000

[54] WAVELENGTH DETECTING DEVICE

[75] Inventor: Norihisa Naganuma, Sapporo, Japan

[73] Assignee: Fujitsu Limilted, Kawasaki, Japan

[21] Appl. No.: 09/244,039

[22] Filed: Feb. 4, 1999

[30] Foreign Application Priority Data

Jun. 10, 1998 [JP] Japan ................................. 10-162396

[51] Int. Cl.$^7$ ....................................................... G01J 3/15
[52] U.S. Cl. ........................... 356/416; 356/419; 250/226
[58] Field of Search ..................................... 356/300, 326, 356/328, 416, 419; 250/226; 372/32

[56] References Cited

U.S. PATENT DOCUMENTS

| | | | |
|---|---|---|---|
| 4,103,254 | 7/1978 | Chikami | 372/32 |
| 4,547,664 | 10/1985 | Vogt et al. | 372/32 |

FOREIGN PATENT DOCUMENTS

| | | |
|---|---|---|
| 61-22250 | 7/1986 | Japan . |
| 5-296832 | 11/1993 | Japan . |

*Primary Examiner*—F. L. Evans
*Attorney, Agent, or Firm*—Staas & Halsey LLP

[57] ABSTRACT

A wavelength detecting device is used for a wavelength multiplexing optical communication system, is simple and inexpensive, and can strictly control the wavelengths of signal beams that are close to one another. The device has a path splitter and a wavelength selector. The path splitter splits a beam into at least three beams having different path angles. The wavelength selector filters the split beams into beams having predetermined wavelengths. One of the filtered beams is provided as a signal beam and the other beams are provided as monitor beams used to detect the wavelength of the signal beam.

39 Claims, 7 Drawing Sheets

WAVELENGTH DETECTING DEVICE

BACKGROUND OF THE INVENTION

1. Field of the Invention

The present invention relates to a wavelength detecting device and, more particularly, to a wavelength detecting device used for a wavelength multiplexing optical communication system to strictly control wavelengths, of signal beams, that are close to one another.

2. Description of the Related Art

Presently developed wavelength multiplexing communication systems multiplex 8 to 32 signal beams whose wavelengths are close to one another, e.g., between 0.8 nm (100 GHz) and 1.6 nm (200 GHz) apart.

For these signal beams, it is necessary to strictly control the wavelengths thereof. To handle signal beams having wavelength gaps of 0.8 nm, it is necessary to set a pass band of 0.2 nm for multiplexers and demultiplexers and a wavelength fluctuation of 0.1 nm for signal beams. If the wavelength of a signal beam shifts more than 0.1 nm, crosstalk will occur between the signal beam and adjacent signal beams. To prevent this, the communication system generally has a mechanism for fixing the wavelengths of signal beams.

If the wavelength of a signal beam in one channel excessively fluctuates, it will interfere with an adjacent channel to hinder the transmission of signal beams in both the channels. To prevent this, the communication system usually has, at the signal output side thereof, a wavelength selecting function to stop a signal beam if the wavelength thereof fluctuates extremely.

FIG. 1 shows a wavelength detecting device according to a prior art.

A laser diode 10 emits a signal beam having a wavelength of λ. The signal beam is passed through a collimator lens 11 to form a collimated beam, which is passed through a collimator lens 15 to an optical fiber 16. Between the collimator lenses 11 and 15, there are arranged couplers 12 and 13 and a band-pass filter 14 having a pass wavelength of λ. The band-pass filter 14 is arranged at an output port to block an output signal beam if its wavelength fluctuates extremely.

Part of the signal beam from the collimator lens 11 is branched by the couplers 12 and 13. The branched beams are passed through band-pass filters 17 and 18 having pass wavelengths of "λ-α" and "λ+α" to collimator lenses 19 and 20. The collimator lenses 19 and 20 focus the branched beams having the wavelengths "λ-α" and "λ+α" on photodiodes 21 and 22, which convert the beams into electric signals.

The output currents of the photodiodes 21 and 22 are supplied to a differential amplifier 23 and a level meter 24 to detect a zero point where the current difference between the photodiodes 21 and 22 becomes zero. The zero point corresponds to a cross point of wavelength characteristic curves around the wavelengths "λ-α" and "λ+α" and is equal to the center wavelength λ of the signal beam.

According to the output of the level meter 24, a control circuit (not shown) carries out feedback control on the wavelength of the signal beam emitted from the laser diode 10 as indicated with a dotted line, to maintain the output of the level meter 24 at zero, i.e., to maintain the wavelength of the signal beam at λ.

This prior art employs two couplers 12 and 13 in a signal beam path, to increase the signal loss. In addition, the prior art must arrange three wavelength selecting elements, i.e., the band-pass filters 14, 17, and 18. These elements increase the number of components in the wavelength detecting device, need individual adjustments and increase the manufacturing cost.

SUMMARY OF THE INVENTION

An object of the present invention is to provide a wavelength detecting device having a hologram and a wavelength selector. The hologram splits a collimated beam of an optional wavelength into beams having different path angles. The wavelength selector passes the split beams to form beams having different wavelength characteristics including a signal beam traveling along a main optical axis and two monitor beams traveling toward photodetectors arranged around the main optical axis.

In the device, the hologram serves as a diffraction grating for splitting a beam, and the wavelength selector serves to provide a signal beam and monitor beams having different wavelength characteristics. With these elements, the device has a reduced signal, and fewer components, no adjustments, and a decreased manufacturing cost.

In order to accomplish the object, the present invention provides a wavelength detecting device having a path splitter for splitting a beam into at least three beams having different path angles and a wavelength selector for filtering the split beams into a signal beam and monitor beams having predetermined wavelengths.

The wavelength detecting device also has photoelectric transducers for transducing the monitor beams into electric signals. The device may have a power branching unit in a path for propagating the signal beam, to branch part of the signal beam into a monitor beam, which is transduced to an electric signal by a photoelectric transducer.

The path splitter may be a transmission-type diffraction grating (hologram) or a trapezoidal prism whose top face is smaller than a beam diameter. The wavelength selector may be a diffraction grating, a multilayer dielectric film, or an etalon, and the pass wavelength thereof with respect to a given beam is dependent on the incident angle of the beam.

The present invention also provides a wavelength detecting apparatus employing the wavelength detecting device mentioned above and a wavelength detecting circuit that compares currents provided by the photoelectric transducers of the wavelength detecting device with each other and detects the wavelength of a signal beam according to the current difference. This apparatus has a control circuit for carrying out feedback control on a source of the signal beam, to maintain the current difference at a set value.

The present invention also provides a wavelength multiplexing optical communication apparatus that employs the wavelength detecting apparatus mentioned above. The wavelength detecting apparatus is installed for each of optical channels to be multiplexed in the communication apparatus. The wavelength detecting apparatus may have an attenuator for providing preemphasis characteristics. The attenuator may be a fixed one or one that is controlled according to a monitor current obtained from a signal beam.

BRIEF DESCRIPTION OF THE DRAWINGS

The present invention will be more clearly understood from the description as set forth below with reference to the accompanying drawings in which.

DESCRIPTION OF THE PREFERRED EMBODIMENTS

Figure 1:
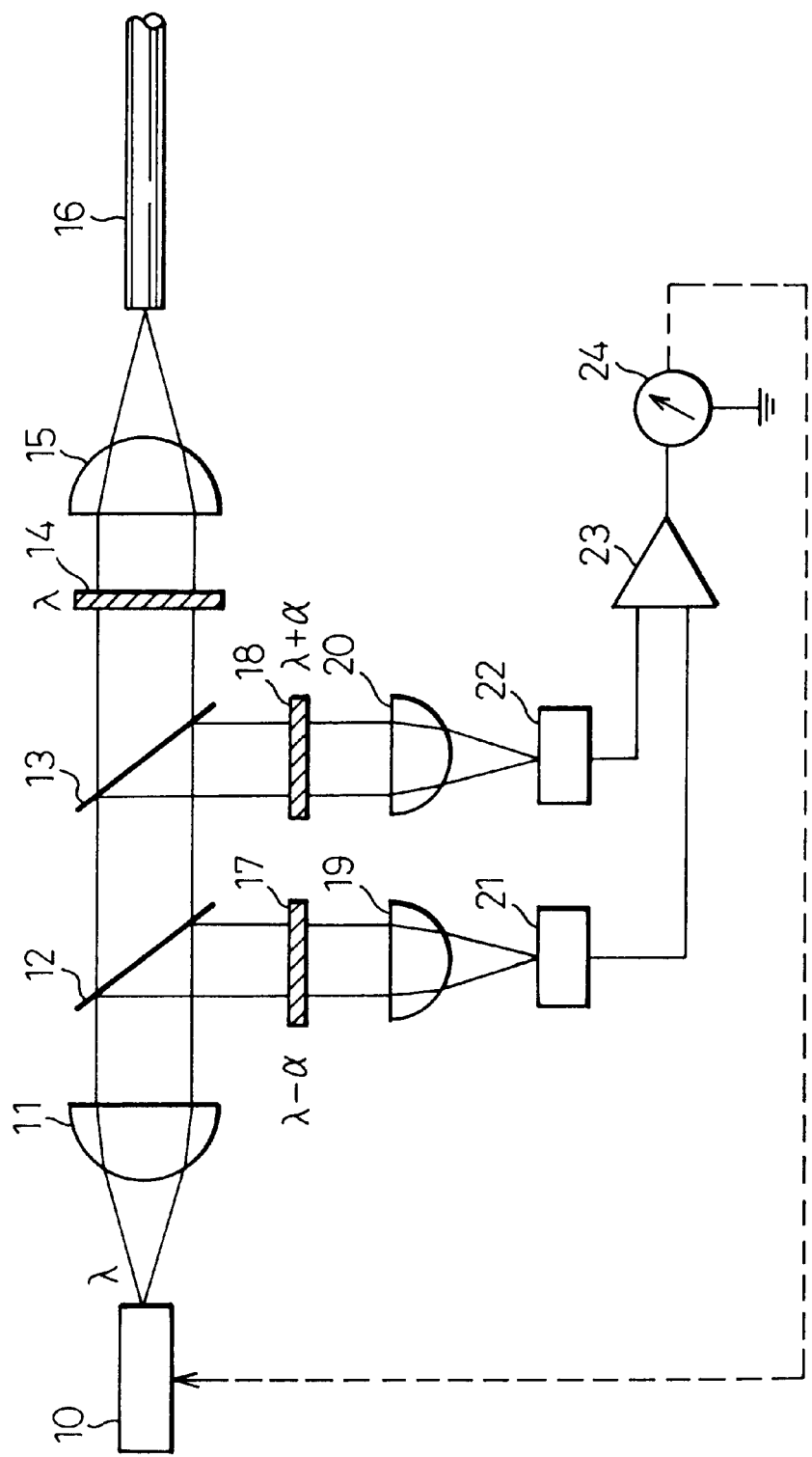
FIG. 1 shows a wavelength detecting device according to a prior art.

A wavelength detecting device according to an embodiment of the present invention and the operation thereof will be explained with reference to FIGS. 2 to 5.

The wavelength detecting device has an input fiber 31 fixedly bonded to a ferrule 32. A collimator lens 33 is fixed to a holder 34, which is adjusted to the focal position of the input fiber 31 and is fixedly welded to the ferrule 32.

A laser source (not shown) emits a beam having a certain wavelength. The beam is passed through the input fiber 31, is spatially emitted, and is passed through the collimator lens 33, which converts the beam into a collimated beam. The collimated beam is passed through a diffraction grating 35 having a hologram beam splitter. The grating 35 splits the beam into primary, secondary, and tertiary beams around a main optical axis 46. The power of a beam exponentially decreases as the order thereof increases from the primary order. Accordingly, the present invention uses only the primary beams 47 and 48 as monitor beams. The primary beams 47 and 48 are emitted in left and right directions at equal angles around the main optical axis 46. A beam traveling along the main optical axis 46 is a signal beam.

Figure 3:
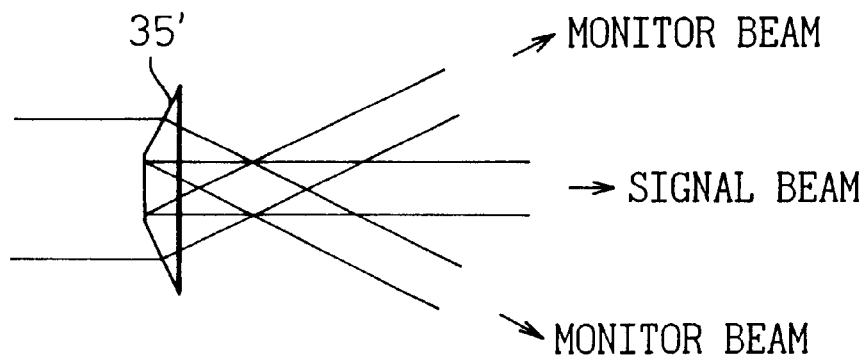
FIG. 3 shows a trapezoidal prism serving as a path splitter.
Figure 4:
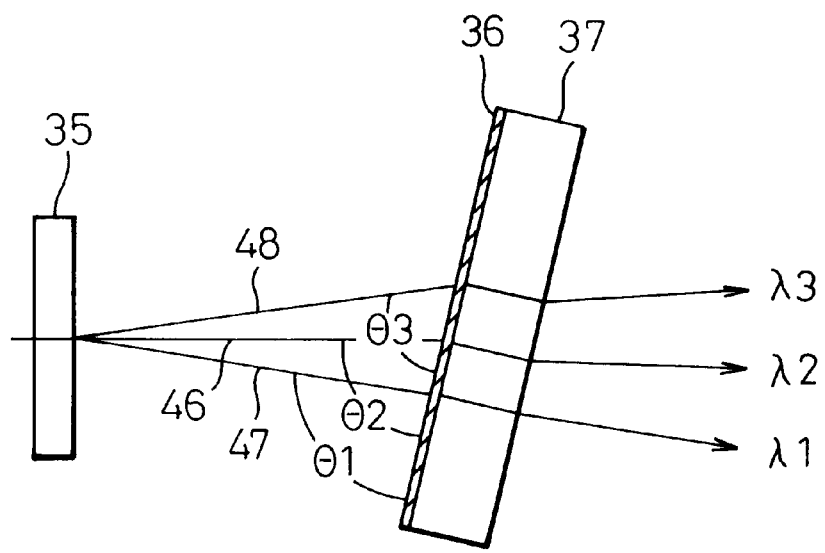
FIG. 4 shows an inclined band-pass filter.

The diffraction grating 35 with the hologram beam splitter may be replaced with a trapezoidal prism 35' of FIG. 3, which is made by cutting the top of a conical prism. The top of the prism 35' must be smaller than the diameter of a beam to be passed through the prism 35'. The power ratio between the signal beam and the monitor beams is optionally selectable according to the shape of the prism 35'.

The signal beam and monitor beams from the grating 35 are made incident to a parallel substrate 37. The parallel substrate 37 has a band-pass filter 36 made of a multilayer dielectric film. The present invention inclines the band-pass filter 36. The operation of the inclined band-pass filter 36 will be explained with reference to FIGS. 4, 5A, and 5B.

The band-pass filter 36 is inclined with respect to the main optical axis 46 so that the first primary beam 47 enters the band-pass filter 36 at an incident angle θ1, the main optical axis 46 at an incident angle θ2, and the second primary beam 48 at an incident angle θ3. These incident angles have a relationship of θ1>θ2>θ3.

Figure 5A:
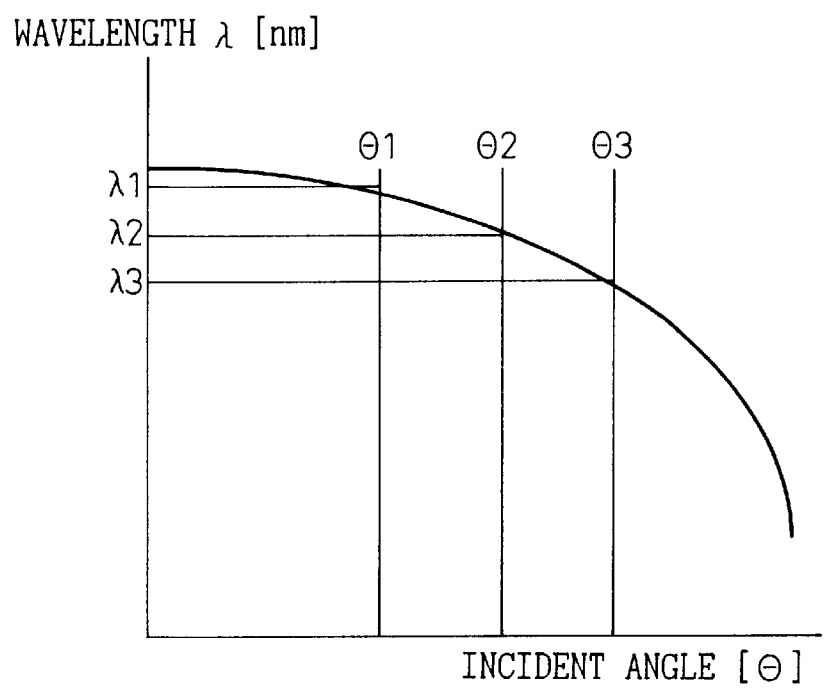
FIGS. 5A and 5B show the incident angle-pass wavelength characteristic curves of the inclined band-pass filter.

FIG. 5A shows that a pass wavelength λ provided by the band-pass filter 36 for a given beam is dependent on the incident angle θ of the beam. The single band-pass filter 36 is capable of providing signal beams having different incident angles with wavelength passing characteristics having different center wavelengths.

In FIG. 5A, the first primary beam 47 of the incident angle θ1 is provided with a central pass wavelength of λ1, the main optical axis 46 of the incident angle θ with a central pass wavelength of λ2, and the second primary beam 48 of the incident angle ζ3 with a central pass wavelength of λ3. When seen from the main optical axis 46 that has the intermediate incident angle θ2 and central pass wavelength λ2, the first primary beam 47 serving as a monitor beam has the longer wavelength λ1, and the second primary beam 48 serving also as a monitor beam has the shorter wavelength λ3.

Figure 5B:
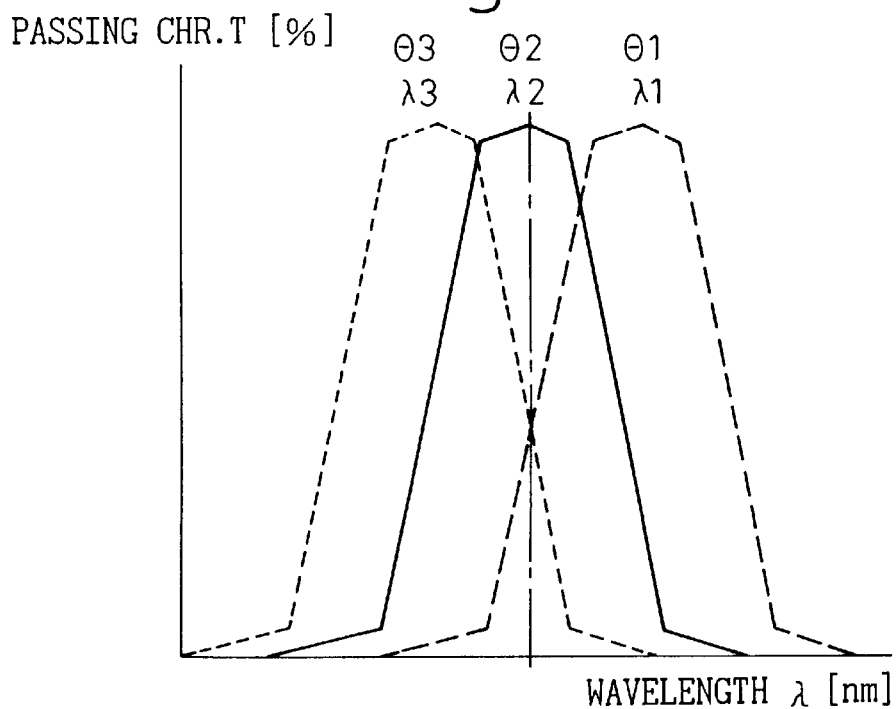

FIG. 5B shows the wavelength passing characteristics having the center wavelengths λ1, λ2, and λ3. The band-pass characteristic around λ2 indicated with a continuous line corresponds to that of the band-pass filter 14 of FIG. 1 of the prior art. The band-pass characteristics around λ1 and λ3 indicated with dotted lines correspond to those of the band-pass filters 17 and 18 of FIG. 1.

Returning to FIG. 2, the signal beam of wavelength λ2 traveling along the main optical axis 46 passes through the band-pass filter 36 and parallel substrate 37 toward a collimator lens 40, which focuses the signal beam on an output fiber 43. The output fiber 43 is adjusted to a ferrule 42, a holder 41, a sphere fitting pipe 44, and a block 45 and is fixed to a casing 30.

The first and second primary beams 47 and 48 passed through the band-pass filter 36 form the monitor beams of wavelengths λ1 and λ3, which are passed through the parallel substrate 37 toward photodiodes 38 and 39. The photodiodes 38 and 39 are adjusted to the axes of the monitor beams 48 and 47 and are fixed. Signal lines from the photodiodes 38 and 39 are bonded to electric terminals 49-1 to 49-4 on the casing 30.

As indicated with the dotted lines in FIG. 5B, the wavelength characteristics of the monitor beams 47 and 48 cross each other at the center wavelength λ2 of the main optical axis 46. The photodiodes 38 and 39 transduce the monitor beams 48 and 47 to signal currents, which are supplied to a differential amplifier (not shown). The differential amplifier provides a differential current that is used by a control circuit (not shown) to carry out feedback control to maintain the differential current at zero.

This feedback control maintains the wavelength of the signal beam at a required value (in this example, λ2) with the use of, for example, temperature control. The temperature control is achieved using, for example, a Peltier element according to the wavelength-temperature characteristics of the signal beam.

If the wavelength of the signal beam fluctuates due to some trouble at a signal source, the wavelength characteristic curve (the continuous line of FIG. 5B) of the band-pass filter 36 for the main optical axis 46 properly attenuates the signal beam. Accordingly, fluctuations in the wavelength of the signal beam never affect other signal beams in adjacent channels when the signal beams are multiplexed by a multiplexer arranged after the wavelength detecting device of the present invention. Namely, the present invention confines fluctuations in the wavelength of a given signal beam to within the channel of the signal beam.

Figure 2:
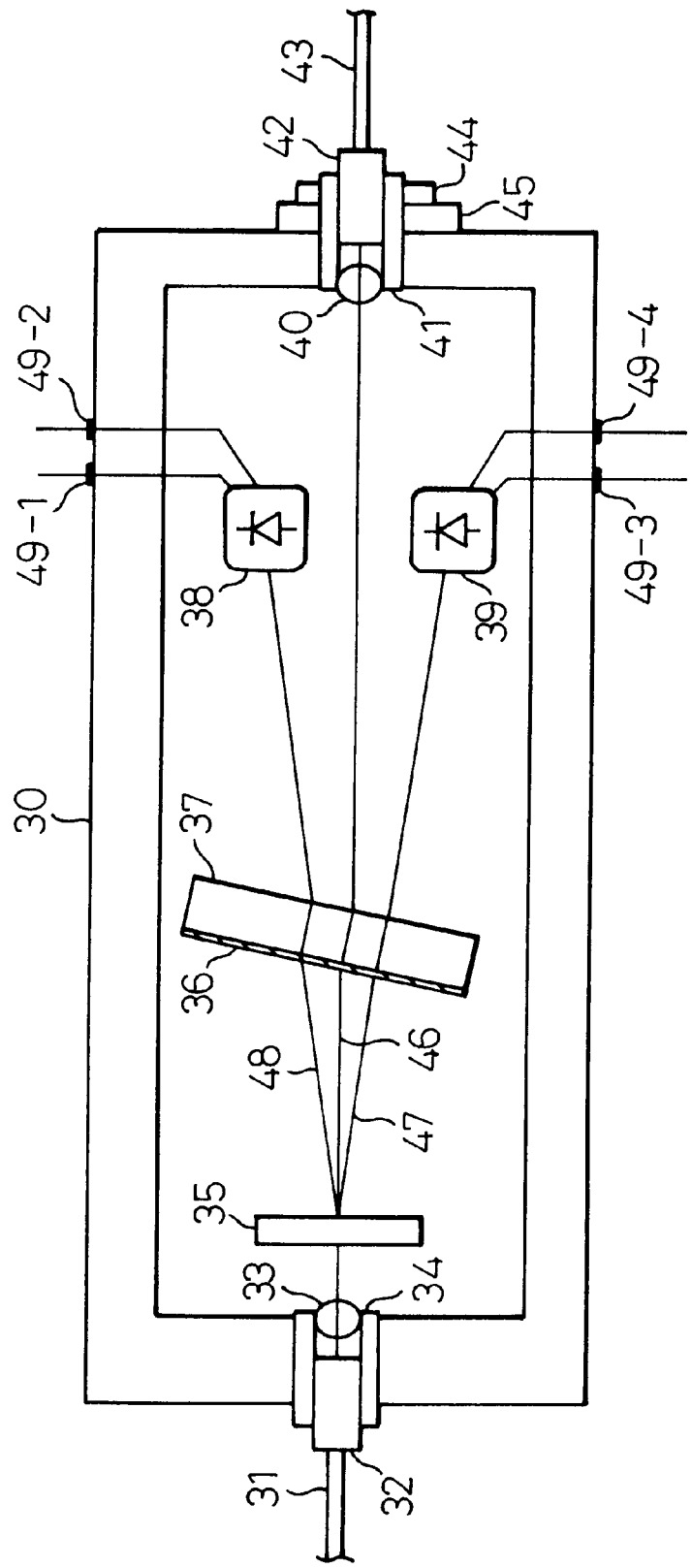
FIG. 2 shows a wavelength detecting device according to an embodiment of the present invention.

The arrangement of FIG. 2 of the present invention eliminates the couplers 12 and 13 of FIG. 1 of the prior art, to avoid signal loss due to the couplers. In addition, the present invention integrates the three band-pass filters 14, 17, and 18 of FIG. 1 into the band-pass filter (wavelength selector) 36, and therefore, needs no filter adjustment work.

Figure 6:
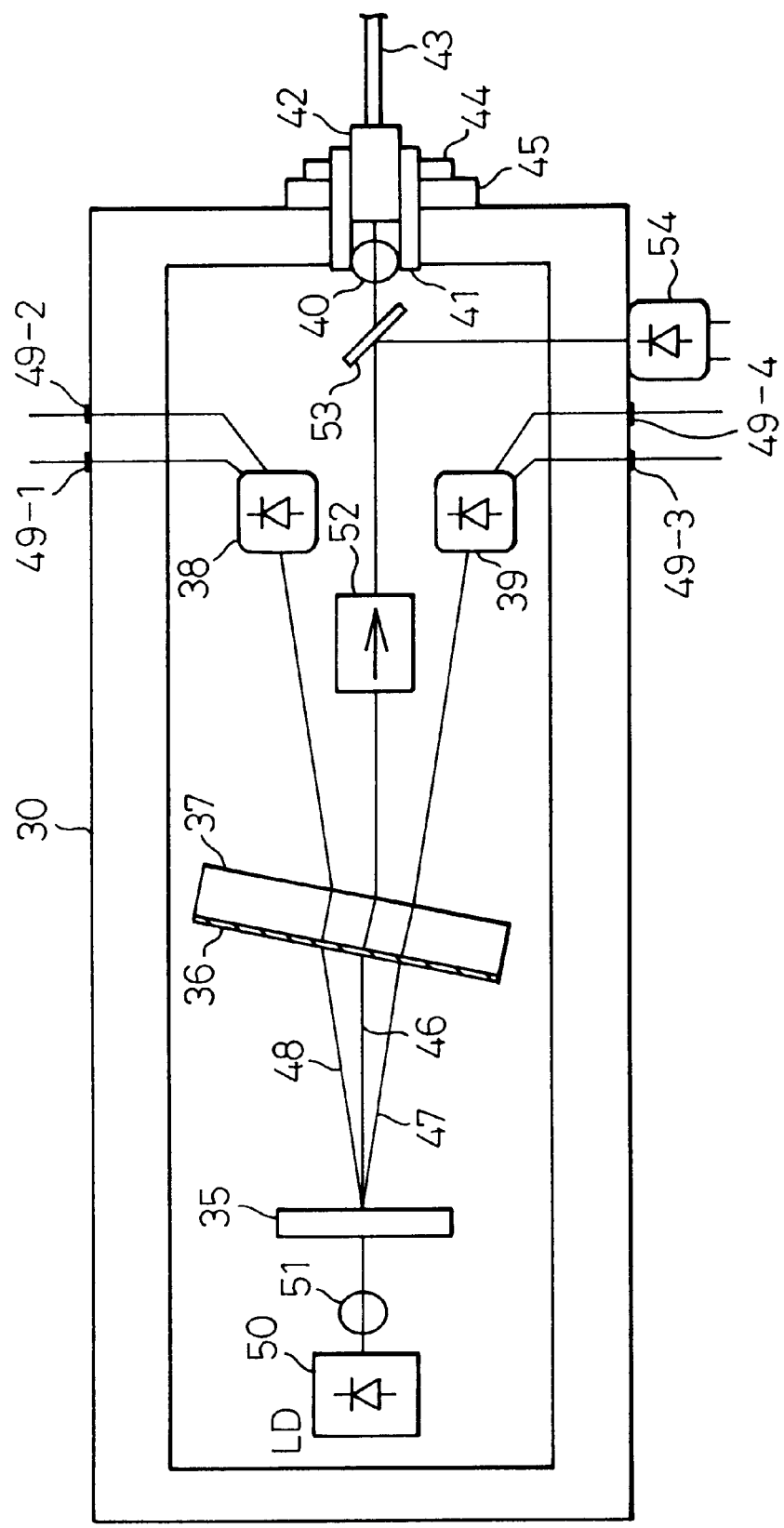
FIG. 6 shows a wavelength detecting device according to another embodiment of the present invention.

FIG. 6 shows a wavelength detecting device according to another embodiment of the present invention.

In FIG. 6, the same parts as those of FIG. 2 are represented with like reference marks and are not explained again.

A laser diode 50 serving as a signal source is installed inside a casing 30. The laser diode 50 emits a beam, which is passed through a collimator lens 51 to form a collimated beam. The collimated beam is passed through a diffraction grating 35 having a hologram beam splitter.

The operation that follows is the same as that of the embodiment of FIG. 2. An isolator 52 and a coupler 53 are arranged in a signal beam path. The coupler 53 partly branches a signal beam, and the branched beam is supplied to a monitoring photodiode 54. The photodiode 54 provides a monitor current, which is used to stabilize the output power of the signal beam, detect faults, and realize a preemphasis function for wavelength multiplexing transmission.

The wavelength detecting device of the present invention may be used as a preliminary module for a post-amplifier by inserting an isolator into a spatial beam made incident to the diffraction grating 35 and by arranging a 2-core output port for excitation beam multiplexing. The band-pass filter 36 may be made of not only a multilayer dielectric film but also of an etalon, etc.

Figure 7A:
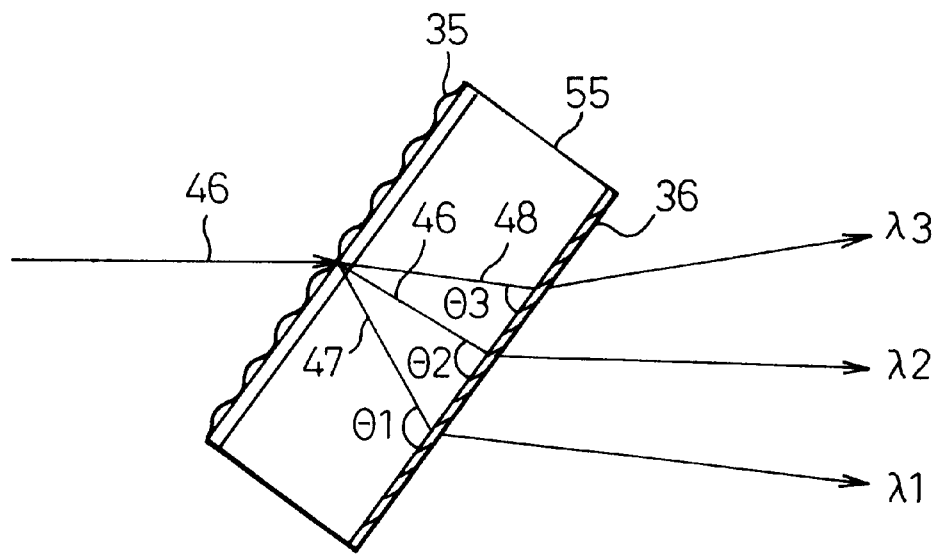
FIG. 7A shows a combination of a beam splitter and a wavelength selector according to the present invention.
Figure 7B:
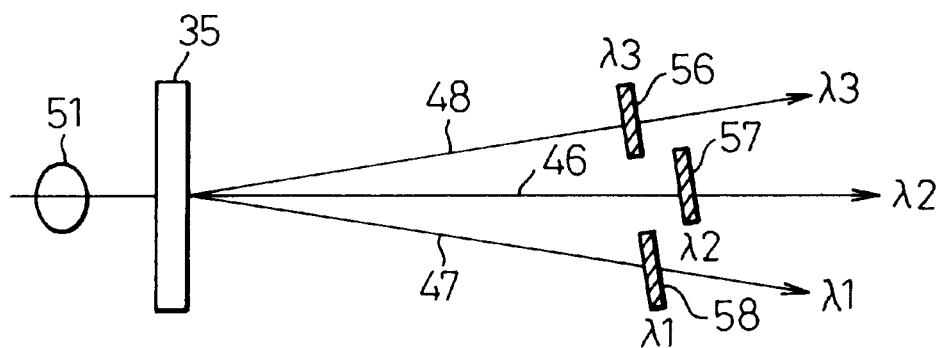
FIG. 7B shows a combination of a beam splitter and wavelength selectors according to the present invention.

FIGS. 7A and 7B show examples of beam splitters and wavelength selectors according to the present invention.

In FIG. 7A, a diffraction grating 35 has a hologram beam splitter, and a band-pass filter 36 is made of a multilayer dielectric film. The diffraction grating 35 and band-pass filter 36 are integrated into a unitary structure by arranging them on the opposite faces of a parallel substrate 55. The relationships between incident angles θ1 to θ3 and pass wavelengths λ1 to λ3 are the same as those of FIGS. 5A and 5B.

In FIG. 7B, a diffraction grating 35 has a hologram beam splitter to provide a main optical axis 46 and first and second primary beam axes 47 and 48. Band-pass filters 57, 58, and 56 having central pass wavelengths λ2, λ1, and λ3 are arranged in the optical axes 46, 47, and 48, respectively. Although this example employs three wavelength selectors 56, 57, and 58 similar to the prior art of FIG. 1, the example employs only one beam splitter 35 compared with the two couplers 12 and 13 of the prior art, to reduce signal loss due to the couplers.

Figure 8A:
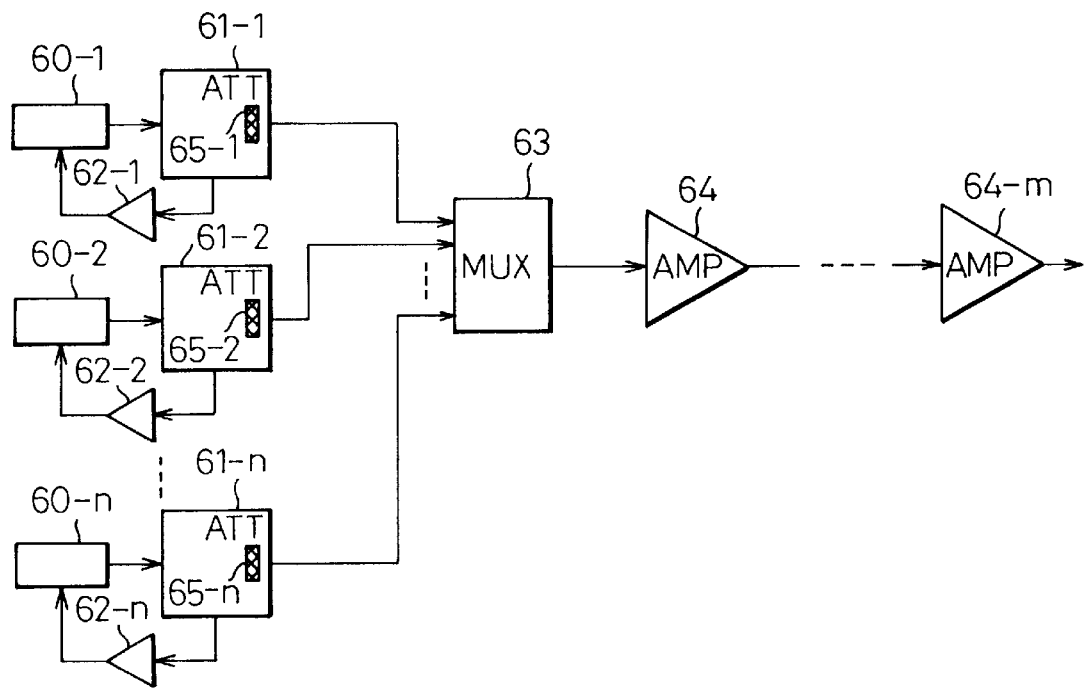
FIG. 8A shows a wavelength multiplexing transmission system employing the wavelength detecting devices of the present invention.
Figure 8B:
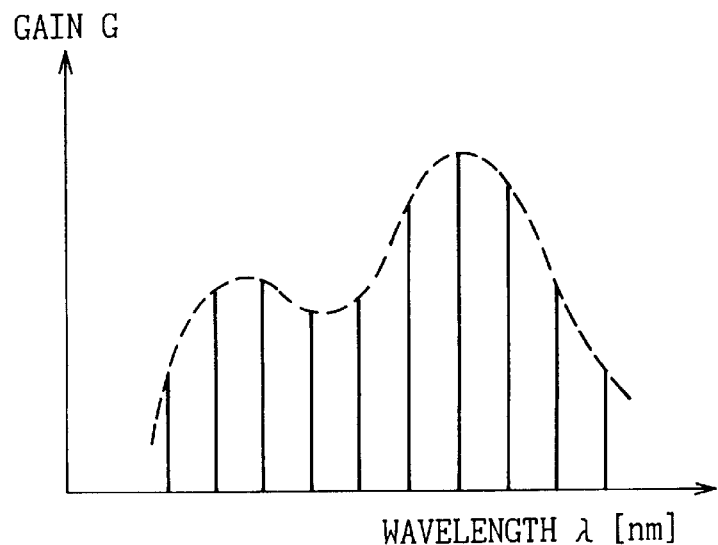
FIG. 8B shows an example of the gain-wavelength characteristic curve of the system of FIG. 8A.

FIGS. 8A and 8B show a wavelength multiplexing transmission system employing the wavelength detecting device of the present invention, in which FIG. 8A shows the system and FIG. 8B shows an example of the gain-wavelength characteristics of the system.

In FIG. 8A, beam sources 60-1 to 60-n emit signal beams to be wavelength-multiplexed. The signal beams are supplied to the wavelength detecting devices 61-1 to 61-n of the present invention. In this example, the devices 61-1 to 61-n are each the device of FIG. 2 that receives a signal beam from the outside.

Shifts in center wavelengths detected by the devices 61-1 to 61-n are used by feedback control circuits 62-1 to 62-n to carry out temperature control (wavelength maintaining control) on the beam sources 60-1 to 60-n. The devices 61-1 to 61-n provide signal beams having fixed wavelengths to a wavelength multiplexer (MUX) 63, which wavelength-multiplexes the signal beams and transmits the multiplexed signal to an opposite system through a transmission line.

For long-distance transmission, many relay amplifiers 64-1 t 64-m are inserted in the transmission line. In this case, the multiplexed signal received at the opposite system involves wavelength-gain characteristics such as those shown in FIG. 8B caused by the intrinsic wavelength-gain characteristics of the relay amplifiers 64-1 to 64-m, even if the power maintaining control is carried out on the beam sources 60-1 to 60-n.

In the worst case, the wavelength-gain characteristics of FIG. 8B make the opposite system unable to detect some wavelength signals contained in the multiplexed signal. To avoid this problem, the wavelength detecting devices 61-1 to 61-n are provided with preemphasis attenuators 65-1 to 65-n, respectively, that have wavelength-gain characteristics opposite to that of FIG. 8B. The attenuators 65-1 to 65-n may be fixedly installed in the system.

A monitor current of a signal beam detected by the photodiode 54 of FIG. 6 may be used by a control circuit (not shown) of the system of FIG. 8A to control a gain according to preemphasis information that may be fixedly stored in the control circuit or externally supplied thereto. The feedback control circuits 62-1 to 62-n may be used to carry out such gain feedback control.

As explained above, the wavelength detecting device of the present invention employs a beam splitter and a wavelength selector, or an integration thereof, to eliminate adjustment work that would be required if the device were made of discrete parts, as in the prior art. The present invention needs no couplers to be inserted in a signal beam path. As a result, the wavelength detecting device of the present invention is small, involves a low manufacturing cost, and minimizes signal loss.

What is claimed is:

1. A wavelength detecting device comprising:
   beam splitting means for splitting a beam into at least three beams having different path angles; and
   wavelength selecting means for filtering the split beams into a signal beam and monitor beams having predetermined wavelengths, the monitor beams being used to detect the wavelength of the signal beam.

2. The device of claim 1, further comprising:
   photoelectric means for transducing the monitor beams into electric signals.

3. The device of claim 1, further comprising:
   power branching means arranged in an optical path that propagates the signal beam so that part of the signal beam may be used as a monitor beam representing the signal beam.

4. The device of claim 3, further comprising:
   means for transducing the monitor beam branched from the signal beam into an electric signal.

5. The device of claim 3, further comprising:
   optical isolating means arranged in the optical path that propagates the signal beam output from the power branching means.

6. The device of claim 1, wherein the beam splitting means is a transmission diffraction grating.

7. The device of claim 1, wherein the beam splitting means is a trapezoidal prism whose top is smaller than a beam diameter.

8. The device of claim 1, wherein the wavelength selecting means is a diffraction grating whose pass wavelength with respect to a given beam depends on the incident angle of the given beam.

9. The device of claim 1, wherein the wavelength selecting means is made of a multilayer dielectric film.

10. The device of claim 1, wherein the wavelength selecting means is made of an etalon.

11. The device of claim 1, wherein the beam splitting means and wavelength selecting means are integrated into a single element.

12. The device of claim 11, wherein the single element is made of a substrate with the beam splitting means and wavelength selecting means are formed on respective, opposite faces of the substrate.

13. The device of claim 1, wherein the wavelength selecting means is arranged for each of the split beams, to filter the split beam into a beam having a predetermined wavelength.

14. The device of claim 1, wherein:
the beam to be split by the beam splitting means is a collimated beam emitted from an optical fiber and passed through a lens;
the beam splitting means splits the collimated beam into three beams having different path angles; and
the wavelength selecting means passes and directs a first one of the three beams to a lens and then to an optical fiber and the other two beams to respective, separate photoelectric transducers.

15. A wavelength detecting apparatus comprising:
a wavelength detecting device comprising:
a beam splitter splitting a beam into at least three beams having different path angles,
a wavelength selector filtering the split beams into a signal beam and monitor beams having predetermined wavelengths, the monitor beams being used to detect the wavelength of the signal beam, and
a photoelectric transducer transducing the monitor beams into electric signals; and
a wavelength detecting circuit for comparing currents from the photoelectric transducer of the wavelength detecting device with each other and detecting the wavelength of the signal beam according to the current difference.

16. The apparatus of claim 15, further comprising:
a control circuit for carrying out feedback control on a signal source of the signal beam to maintain the current difference at a predetermined level.

17. A wavelength multiplexing optical communication apparatus comprising the wavelength detecting apparatus of claim 16 to control wavelengths.

18. The communication apparatus of claim 17, wherein the wavelength detecting apparatus is arranged for each of optical channels to be multiplexed.

19. The communication apparatus of claim 18, wherein the wavelength detecting apparatus has attenuation means for providing preemphasis characteristics.

20. The communication apparatus of claim 19, wherein the attenuation means is controlled according to fixed setting or a monitor current obtained from the signal beam.

21. The device of claim 6, wherein the transmission diffraction grating is a hologram.

22. A wavelength detecting device comprising:
a beam splitter splitting a beam into at least three beams having different path angles; and
a wavelength selector filtering the split beams into a signal beam and monitor beams having predetermined wavelengths, the monitor beams being used to detect the wavelength of the signal beam.

23. The device of claim 22, further comprising:
a photoelectric transducer transducing the monitor beams into electric signals.

24. The device of claim 22, further comprising:
a power branching element arranged in an optical path that propagates the signal beam so that part of the signal beam is usable as a monitor beam representing the signal beam.

25. The device of claim 24, further comprising:
a transducer transducing the monitor beam branched from the signal beam into an electric signal.

26. The device of claim 24, further comprising:
an optical isolator arranged in the optical path that propagates the signal beam output from the power branching means.

27. The device of claim 22, wherein the beam splitting means is a transmission diffraction grating.

28. The device of claim 22, wherein the beam splitter is a trapezoidal prism whose top is smaller than a beam diameter.

29. The device of claim 22, wherein the wavelength selector is a diffraction grating whose pass wavelength with respect to a given beam depends on the incident angle of the given beam.

30. The device of claim 22, wherein the wavelength selector is made of a multilayer dielectric film.

31. The device of claim 22, wherein the wavelength selector is made of an etalon.

32. The device of claim 22, wherein the beam splitter and the wavelength selector are integrated into a single element.

33. The device of claim 32, wherein the single element is made of a substrate with the beam splitter and wavelength selector are formed on respective, opposite faces of the substrate.

34. The device of claim 22, wherein the wavelength selector is arranged for each of the split beams, to filter the split beam into a beam having a predetermined wavelength.

35. The device of claim 22, wherein:
the beam to be split by the beam splitter is a collimated beam emitted from an optical fiber and passed through a lens;
the beam splitter splits the collimated beam into three beams having different path angles; and
the wavelength selector passes and directs a first one of the three beams to a lens and then to an optical fiber and the other two beams to respective, separate photoelectric transducers.

36. The device of claim 27, wherein the transmission diffraction grating is a hologram.

37. A wavelength detecting apparatus comprising:
a wavelength detecting device comprising:
a beam splitter splitting a beam into at least three beams having different path angles,
a wavelength selector filtering the split beams into a signal beam and monitor beams having predetermined wavelengths, the monitor beams being used to detect the wavelength of the signal beam, and
a photoelectric transducer transducing the monitor beams into electric signals; and
a wavelength detecting circuit comparing currents from the photoelectric transducer of the wavelength detecting device with each other and detecting the wavelength of the signal beam according to the current difference.

38. The apparatus of claim 37, further comprising:
a control circuit carrying out feedback control on a signal source of the signal beam to maintain the current difference at a predetermined level.

39. A wavelength multiplexing optical communication apparatus comprising the wavelength detecting apparatus of claim 38 to control wavelengths.

* * * * *